US010928070B2

(12) United States Patent
Morton et al.

(10) Patent No.: US 10,928,070 B2
(45) Date of Patent: Feb. 23, 2021

(54) ELECTRO-MECHANICAL INTERFACE FOR AN APPLIANCE

(71) Applicant: BREVILLE PTY LIMITED, Alexandria (AU)

(72) Inventors: James George Morton, Roseville (AU); Gerard Andrew White, Darlington (AU)

(73) Assignee: BREVILLE PTY LIMITED, Alexandria (AU)

( * ) Notice: Subject to any disclaimer, the term of this patent is extended or adjusted under 35 U.S.C. 154(b) by 21 days.

(21) Appl. No.: 16/323,235

(22) PCT Filed: Aug. 4, 2017

(86) PCT No.: PCT/AU2017/050823
§ 371 (c)(1),
(2) Date: Feb. 4, 2019

(87) PCT Pub. No.: WO2018/023172
PCT Pub. Date: Feb. 8, 2018

(65) Prior Publication Data
US 2019/0170362 A1 Jun. 6, 2019

(30) Foreign Application Priority Data
Aug. 4, 2016 (AU) ................................ 2016903076

(51) Int. Cl.
*F24C 7/08* (2006.01)
*A47J 37/08* (2006.01)
(Continued)

(52) U.S. Cl.
CPC ............... *F24C 7/082* (2013.01); *A47J 37/08* (2013.01); *A47J 37/0842* (2013.01); *H01H 25/06* (2013.01); *H05B 6/68* (2013.01)

(58) Field of Classification Search
CPC ...... A47J 37/08; A47J 37/0842; H01H 25/06; H05B 6/68
See application file for complete search history.

(56) References Cited

U.S. PATENT DOCUMENTS 4,140,048 A 2/1979 Grove et al.
4,849,595 A 7/1989 Fowler
(Continued)

FOREIGN PATENT DOCUMENTS

CN 101 825 914 A 9/2010
WO WO-2007/027621 A2 3/2007

OTHER PUBLICATIONS

International Search Report and Written Opinion for PCT/AU2017/050823, dated Oct. 19, 2017.
(Continued)

*Primary Examiner* — Vicky A Johnson
(74) *Attorney, Agent, or Firm* — Marshall, Gerstein & Borun LLP (57) ABSTRACT

An electro-mechanical interface device for an appliance. The device including: a mounting element having a first side and a second side, the mounting element having a mounting aperture from the first side through to the second side; a first selection element in the form of a hollow sleeve that is partially located through the mounting aperture from the first side of mounting element; and a fastening ring engages the first selection element from the second side of mounting element, such that the first selection element is releasably retained from being withdrawn from the mounting aperture, wherein the first selection element is rotatable with respect to the mounting element. The device may further include a hub element is located within the circular-sleeve of the first selection element that restricts separation of the first selection element from the fastening ring.

25 Claims, 10 Drawing Sheets

(51) Int. Cl.
*H01H 25/06* (2006.01)
*H05B 6/68* (2006.01)

(56) References Cited

U.S. PATENT DOCUMENTS

| | | | |
|---|---|---|---|
| 5,134,262 A | | 7/1992 | Lee |
| 5,558,796 A | | 9/1996 | Cho |
| 5,607,611 A | * | 3/1997 | Lee .......................... G01D 5/25 |
| | | | 219/702 |
| 8,910,542 B2 | * | 12/2014 | Klimecki ............... B60K 37/06 |
| | | | 74/553 |
| 2015/0160683 A1 | * | 6/2015 | Fust .......................... G05G 5/05 |
| | | | 74/490.12 |
| 2019/0170362 A1 | * | 6/2019 | Morton ................... F24C 7/082 |

OTHER PUBLICATIONS

Extended European Search Report issued in European Patent Application No. 17836106.9, dated Aug. 12, 2020.

* cited by examiner

ELECTRO-MECHANICAL INTERFACE FOR AN APPLIANCE

FIELD OF THE INVENTION

The present invention relates to user interface and in particular to electro-mechanical interfaces for an appliance.

The invention has been developed primarily for use as an electro-mechanical interface for an appliance and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

It was recognised that appliance safety can be improved by limiting disassembly or removal of components from external to the appliance. There is a need to improve safety in user appliance.

It was recognised that appliance usability can be improved by an electro-mechanical interface comprising two selector elements.

SUMMARY OF THE INVENTION

It is an aspect of the technology to overcome or ameliorate at least one of the disadvantages of the prior art, or to provide a useful alternative.

It is an aspect of the technology to, in a preferred form, to provide an electro-mechanical interface for an appliance.

According to an aspect of the technology there is provided an apparatus including:

a mounting element having a first side and a second side, the mounting element having a mounting aperture from the first side through to the second side;

a first selection element in the form of a hollow sleeve that is partially located through the mounting aperture from the first side of mounting element;

a fastening ring engages the first selection element from the second side of mounting element, such that the first selection element is releasably retained from being withdrawn from the mounting aperture, wherein the first selection element is rotatable with respect to the mounting element;

A hub element may be located within the circular-sleeve of the first selection element that restricts separation of the first selection element from the fastening ring.

The mounting aperture may be circular and sized to receive the circular sleeve there through. The first selection element may have a flange portion that restricts the first selection element from passing through the mounting aperture. The flange portion may be a radially outwardly protruding circumferential flange.

The hub element may be retained such that it cannot be withdrawn from the first side of the first selection element. The hub element may be rigidly retained with respect to mounting plate, such that the first selection element rotates about the hub element.

The hub element may further include a second selection element.

The first selection element may be rotatable to a user selection orientation. The first selection element being coupled to an electronic module to generate a signal indicative of the user selection orientation that is transmitted to a processor module.

According to an aspect of the technology there is provided an apparatus including:

a mounting element having a first side and a second side, the mounting element having a mounting aperture from the first side through to the second side;

a first selection element in the form of a hollow sleeve that is partially located through the mounting aperture from the first side of mounting element;

a fastening ring engages the first selection element from the second side of mounting element, wherein the first selection element is rotatable with respect to the mounting element;

a hub module is located within the circular-sleeve of the first selection element, the hub module supporting a second selection element.

The first selection element and the second selection element may each be rotatable. The first selection element and the second selection element may be concentrically located.

BRIEF DESCRIPTION OF THE DRAWINGS

A preferred embodiment of the technology will now be described, by way of example only, with reference to the accompanying drawings in which.

DETAILED DESCRIPTION

Figure 1:
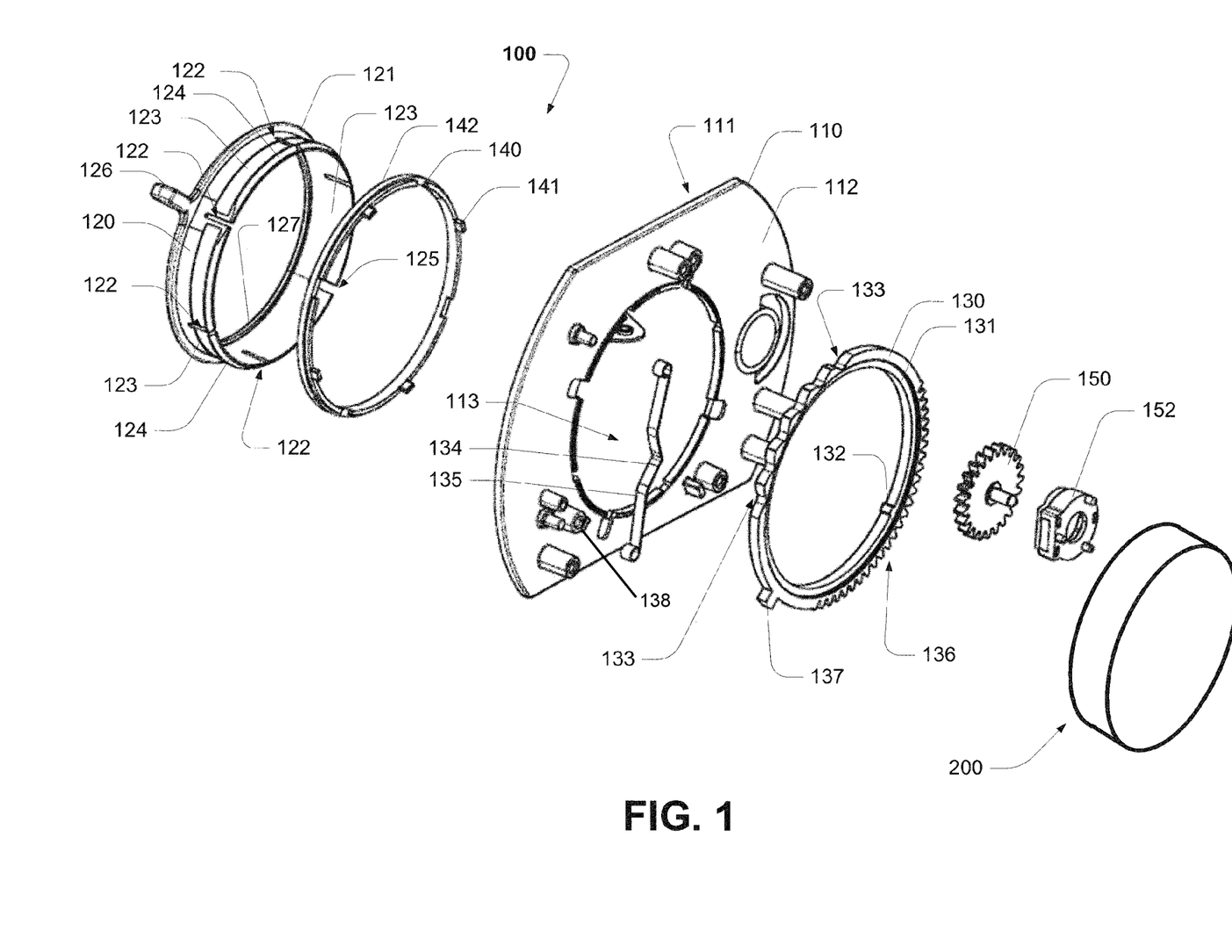
FIG. 1 is an inline for assembly view of an apparatus according to the technology.

Referring to FIG. 1 of the drawings, an example embodiment apparatus 100 includes:

a mounting element 110 having a first side 111 and a second side 112, the mounting element having a substantially circular mounting aperture 113 from the first side to the second side;

a selection element 120 in the form of a circular-sleeve that is located partially through the circular aperture from the first side of mounting element, the selection element having a flange portion 121 that restricts the selection element passing through the mounting aperture;

a fastening ring 130 engaged to the selection element from the second side of mounting element, such that the selection element is releasable retained within the aperture; and a hub element 200 located within the circular-sleeve of the selection element that restricts separation of the selection element from the fastening ring; and wherein the selection element is rotatable to a user selected configuration.

In an embodiment, the selection element 120 has a plurality of axial directed circumferential slots 122 that form snap locking tabs 123 there between. The snap locking tabs 123 have a projection or ridge 124 that releasably captures (or couples to) an inner circumference 131 of the fastening ring 130. It would be appreciated that the tabs 123 have radially-outwardly-directed projections or ridges 124. The leading edge of these projections may be angled to guide inward deflection of the tabs upon engagement with the fastening ring, such that the projections rides through the locking ring and snaps back to releasably engage about the inner circumference 131 to releasably capture the fastening ring 130. Rotation of the selection element 120 causes a respective rotation of the fastening ring 130.

In an embodiment, one of the axially directed slots 125 may be sized to receive an inwardly directed locating protrusion 132 of the fastening ring 130, such that the orientation of the selection element is respectfully keyed to the orientation of the fastening ring. Alternatively, a separate key and slot may be formed in either of the selection element or fastening ring to ensure relative orientation.

The selection element may further include an indicator tab 126 for indicating user selection.

A fastening ring 130 may include a plurality of detents 133 located or spaced about the circumference. A biased locating tab 134 abuts the circumference and detents to selectively resist free rotation of the fastening ring 130, and selection element respectively 120, at orientation conforming to pre-defined user selection orientation of the indicator tab 126. In this example, a locating tab is formed from resilient material 135 and engages the fastening ring to ride over the detents and is biased into a locating configuration within each detent. The locating tab 134 can be coupled to the mounting element. It would be appreciated that other methods of selectively resisting free rotation of the fastening ring can also be applied. Other known methods of selectively restricting rotation can be applied.

Figure 5:
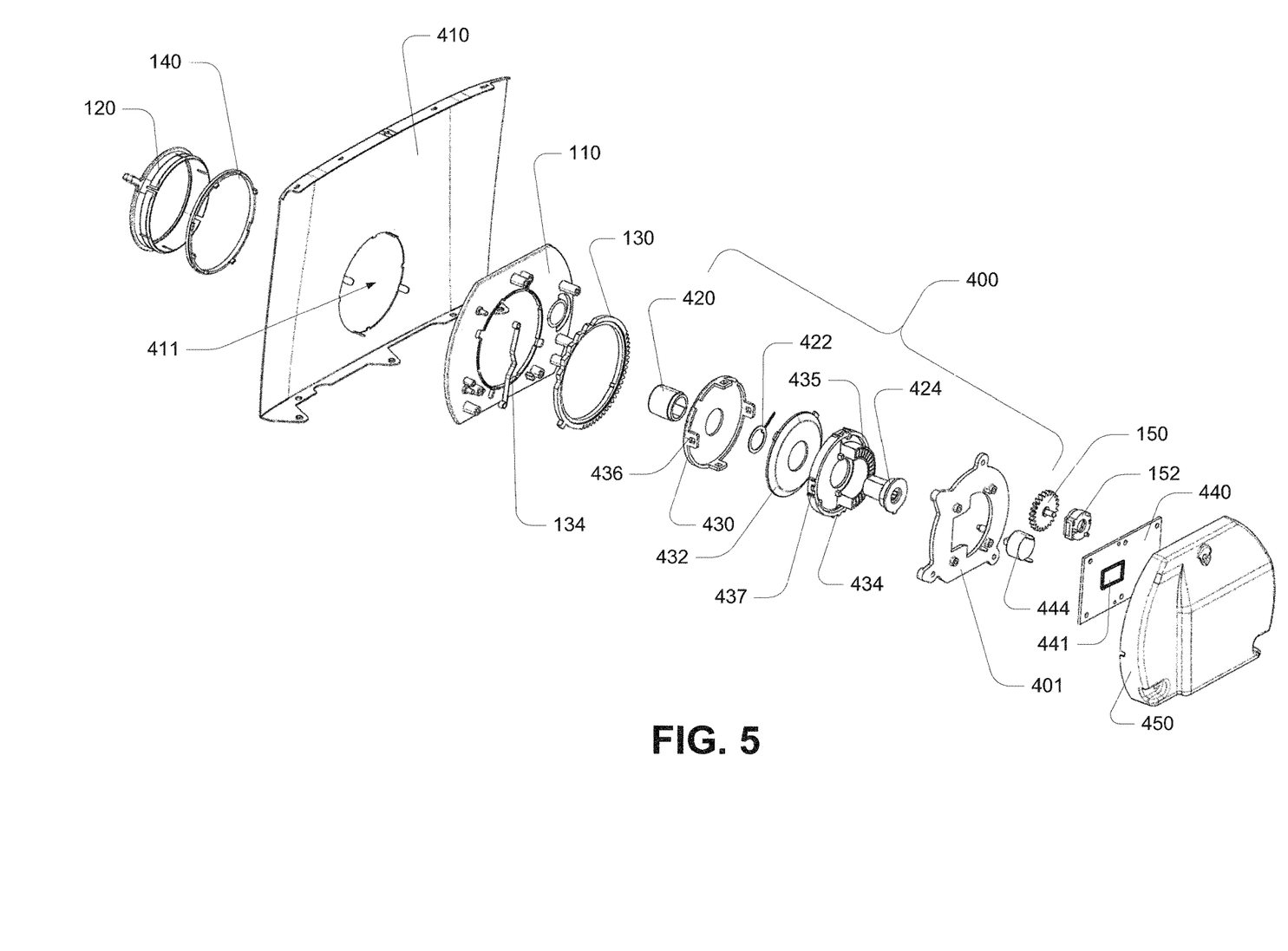
FIG. 5 is an inline for assembly view of an embodiment apparatus according to the technology.

A fastening ring 130 may include a circumferential gear portion 136, having a plurality of teeth, which engages a slave gear 150 that is coupled to a variable resistor 152 for providing a signal to a processor module (for example, as shown in FIG. 5 at 441) that is indicative of the selector element orientation. It would be appreciated that the portion of the circumference occupied by the gear teeth would be sufficient to allow engagement of the slave wheel while the locating tab selectively engages each detent locations. The fastening ring may also include a stop tab 137 to restrict rotation of the locking ring to a pre-defined range. A stop element 138 is located to abut the stop tab as the locking ring is rotated to each extremity of the pre-defined range of rotation. The stop element may protrude from, or be fixed to, the mounting element. It would be appreciated that other methods of restricting rotation to a pre-determined range can also be applied. Other known methods of restricting rotation to a pre-determined range can be applied.

The hub element 200 is located within the circular-sleeve of the selection element, and sized or configured to restrict inward movement and release of the snap tabs from the fastening ring. The hub element can be inserted from the second side, or retained within the sleeve of the selection element, to restrict removal of the selection element from the outside (first side). The hub may be prohibited from passing through the selection element by an inwardly directed ridge 127. The hub element may also be fixed with respect to the mounting element, for example by a mounting bracket 401 shown in FIG. 4, such that the selection element and fastening ring rotate with respect to the hub.

Figure 2:
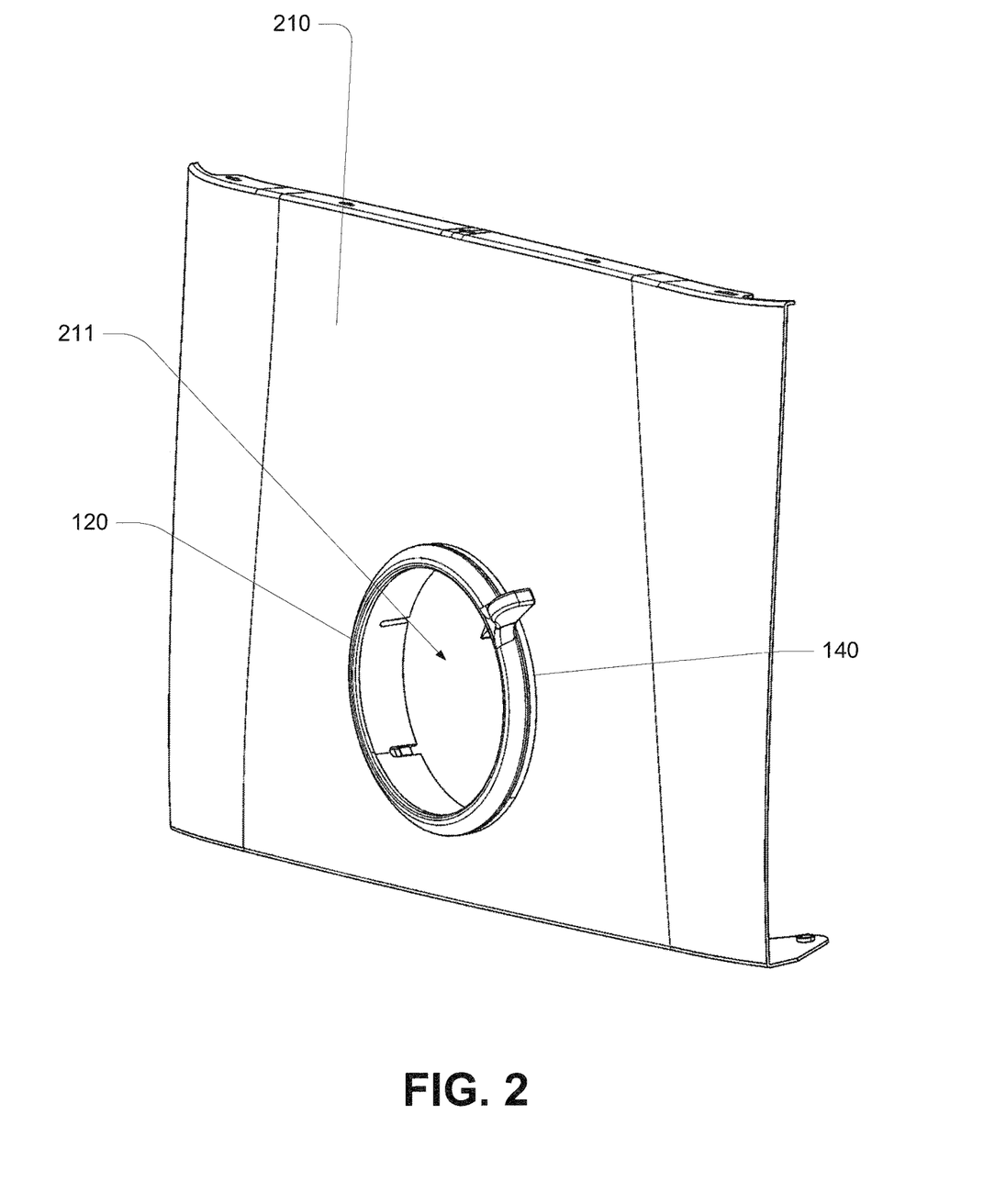
FIG. 2 is a perspective view of a partial apparatus according to the technology.

In some embodiments, a spacer ring 140 may also be included. The spacer ring can be located on the mounting element. The spacer ring is sized to fit about the sleeve of the selection element and can insulate the selection element from the internal elements and the outer skin (for example, as shown in FIG. 2 at 210 and FIG. 4 at 410). The spacer ring engages the mounting element, and may be keyed 141 to the mounting element for prohibiting relative rotation. The spacer ring 140 provides a flat abutment surface 142 for the flange portion 121 of the selector element 120.

It would be appreciated that, when the apparatus is installed in an appliance having a curved outer skin (for example, as shown in FIG. 2), thickness of the spacer ring 140 can be sized to accommodate the curve and allow the selection element to rotate freely. The spacer ring passes through a mounting aperture in the outer skin of the appliance to provide a flat abutment surface for the flange portion of the selector element.

Figure 3:
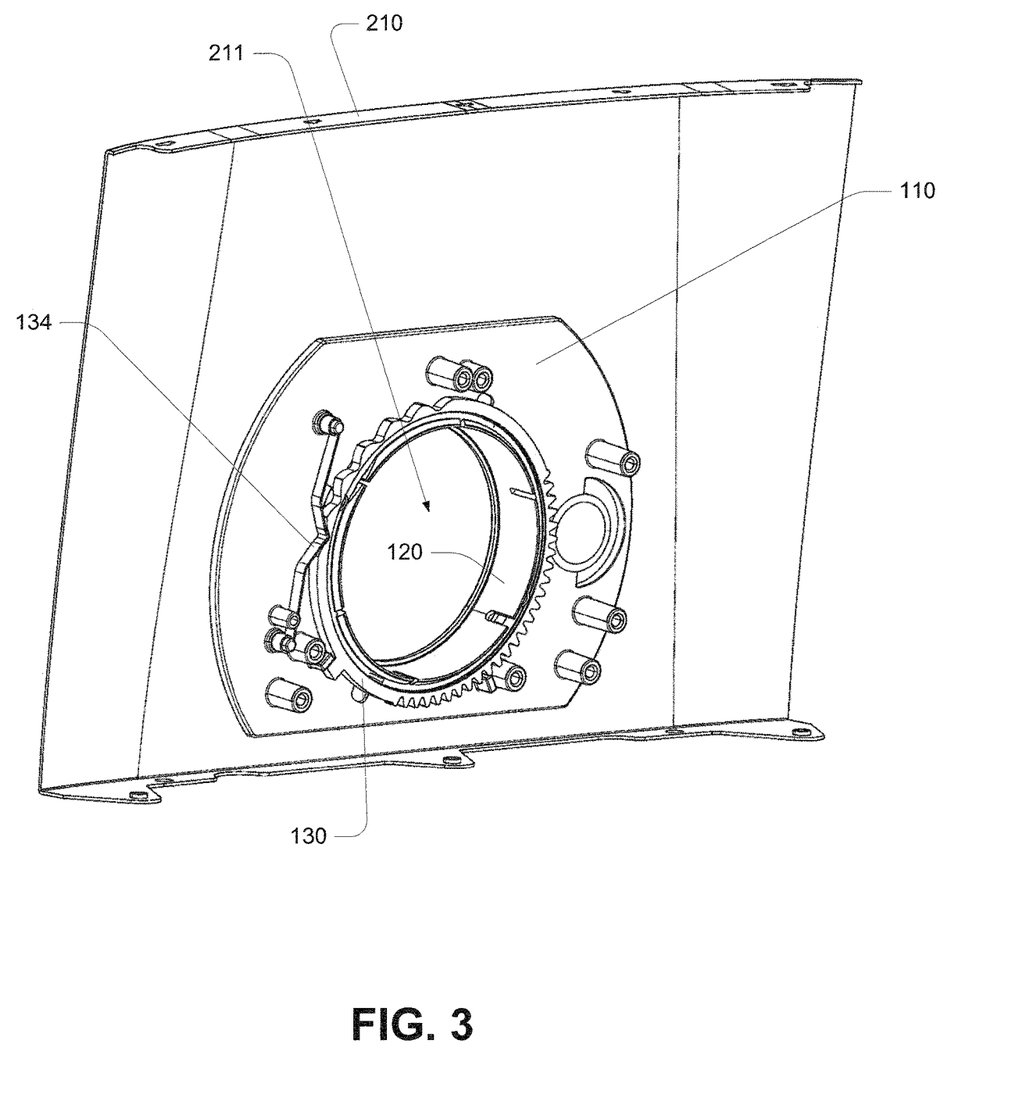
FIG. 3 is a perspective view of the partial apparatus in FIG. 2.

FIG. 2 discloses a prospective view of the apparatus 100 installed on or through an outer skin 210 of an appliance, shown without a hub element located within the selection element. FIG. 3 shows an internal view of the assembled apparatus of FIG. 2.

Figure 4:
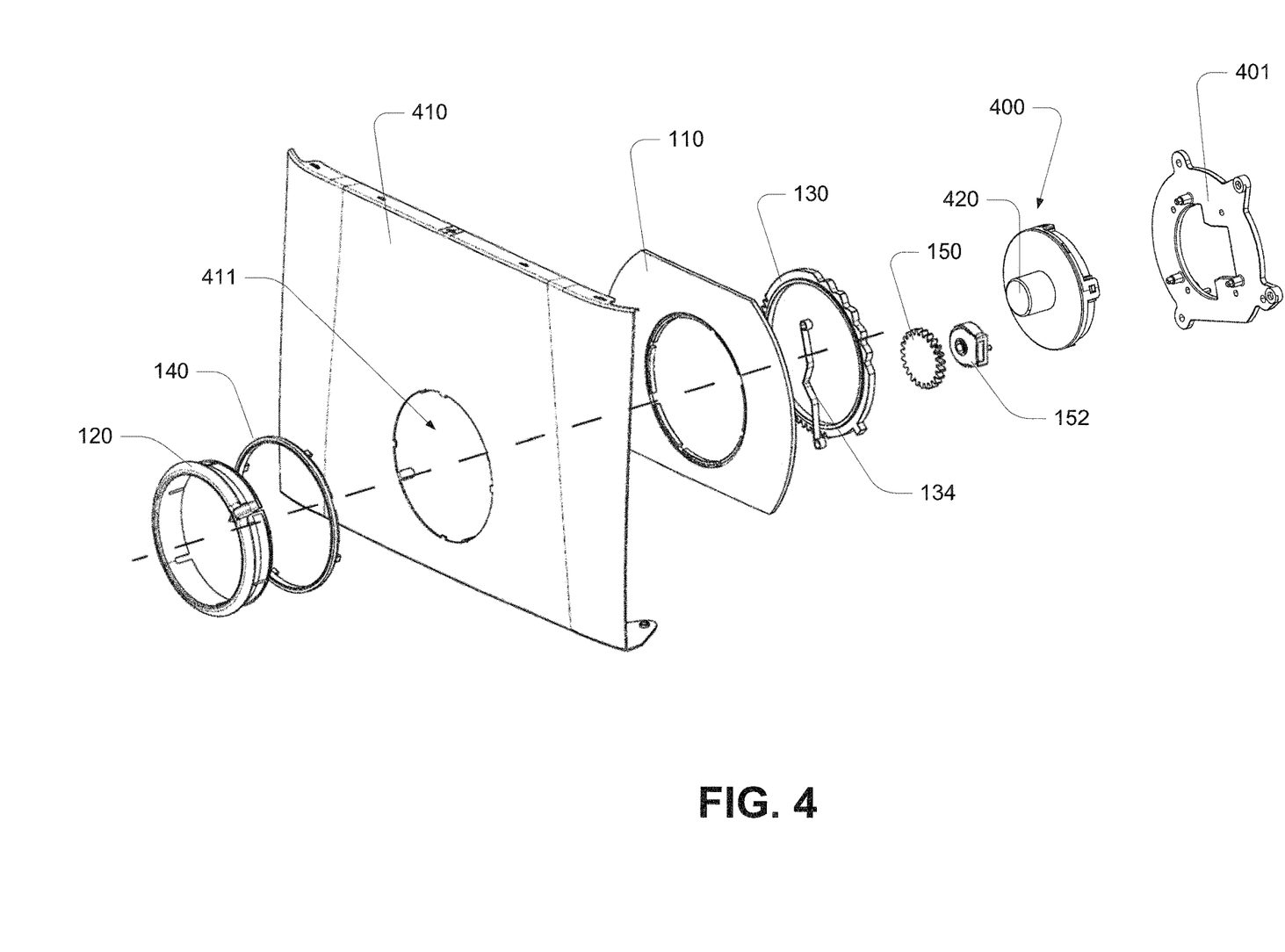
FIG. 4 is an inline for assembly view of an alternative apparatus according to the technology.

FIG. 4 shows an embodiment apparatus that is similar to the apparatus of FIG. 1. In this example embodiment, a hub element or module 400, being comparable to hub element 200 disclosed in FIG. 1, is supported by on a fixing bracket 401 that is fixed to the mounting element 110. The hub element or module 400 is comparable to the hub element 200 disclosed in FIG. 1. The hub element or module is restrained from rotation with respect to the fixing bracket 401 and the mounting element 110. The selection element rotates within the mounting aperture and around the stationary hub.

The apparatus disclosed in FIG. 4, includes:
a mounting element 110 having a first side and a second side, the mounting element having a mounting aperture from the first side through to the second side;
a first selection element 120 in the form of a hollow sleeve that is partially located through the mounting aperture from the first side of mounting element;
a fastening ring 130 that engages the first selection element from the second side of mounting element, wherein the first selection element is rotatable with respect to the mounting element;
a hub module 400 that is located within the circular-sleeve of the first selection element, the hub module supporting a second selection element 420.

In this embodiment, by way of example only, the first selection element and the second selection element may each be concentric and rotatable independently of one another.

A curved outer skin 410 of an appliance, with aperture 411, receives an embodiment selection apparatus. The thickness of the spacer ring 140 is sized to accommodate the curve of the outer skin and allow the selection element 120 to rotate freely. The spacer ring passes through a mounting aperture 411 in the outer skin of the appliance to provide a flat abutment surface for the flange portion of the selector element.

An embodiment hub element or module 400 that includes a second selection assembly, as discussed below with reference to FIG. 5 and FIG. 6.

Figure 6:
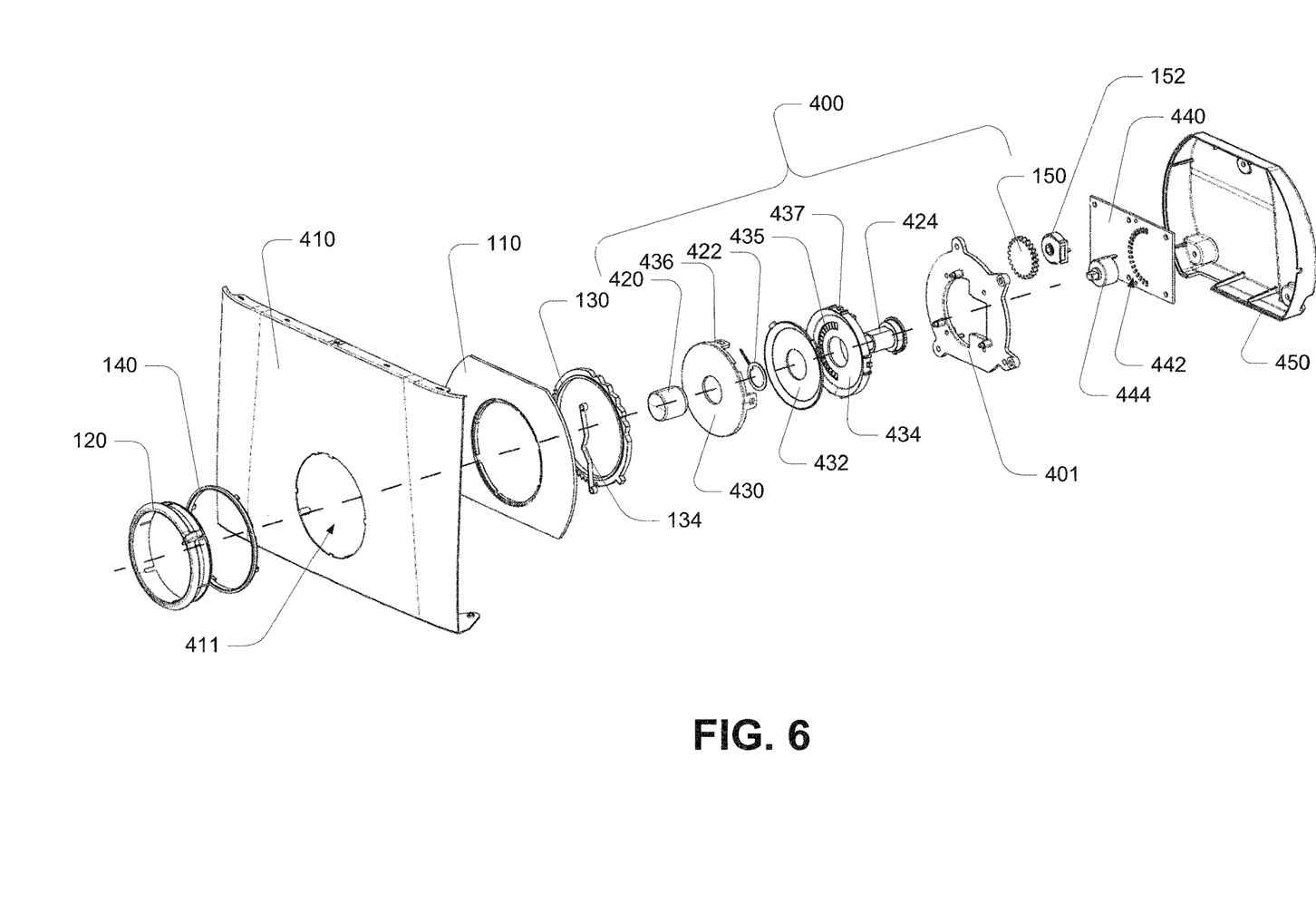
FIG. 6 is an inline for assembly view the technology of FIG. 5.

FIG. 5 and FIG. 6 show in line for assembly views of an apparatus of an example embodiment apparatus. It will be appreciated that this embodiment is similar to FIG. 1 or FIG.

4, and comprises a hub module 400 that includes a further rotating selection element 420.

A hub or lens module 400 includes a front lens element 430, graphics plate 432 and the rear barrier element 434. The hub module further includes or supports a selection element or dial 420, needle indicator 422 and mounting sleeve 424. The lens element is typical clear. The lens element couples or clips to the barrier element and captures the graphics plate and provides relevant alignment. The hub module mounts to the bracket 401 to provide correct alignment with the apparatus and restricts rotation of the hub module. The lens element clips to the barrier element using a plurality of cooperating coupling elements (436,437), that releasable engage the lens element clips and the barrier element.

Figure 7:
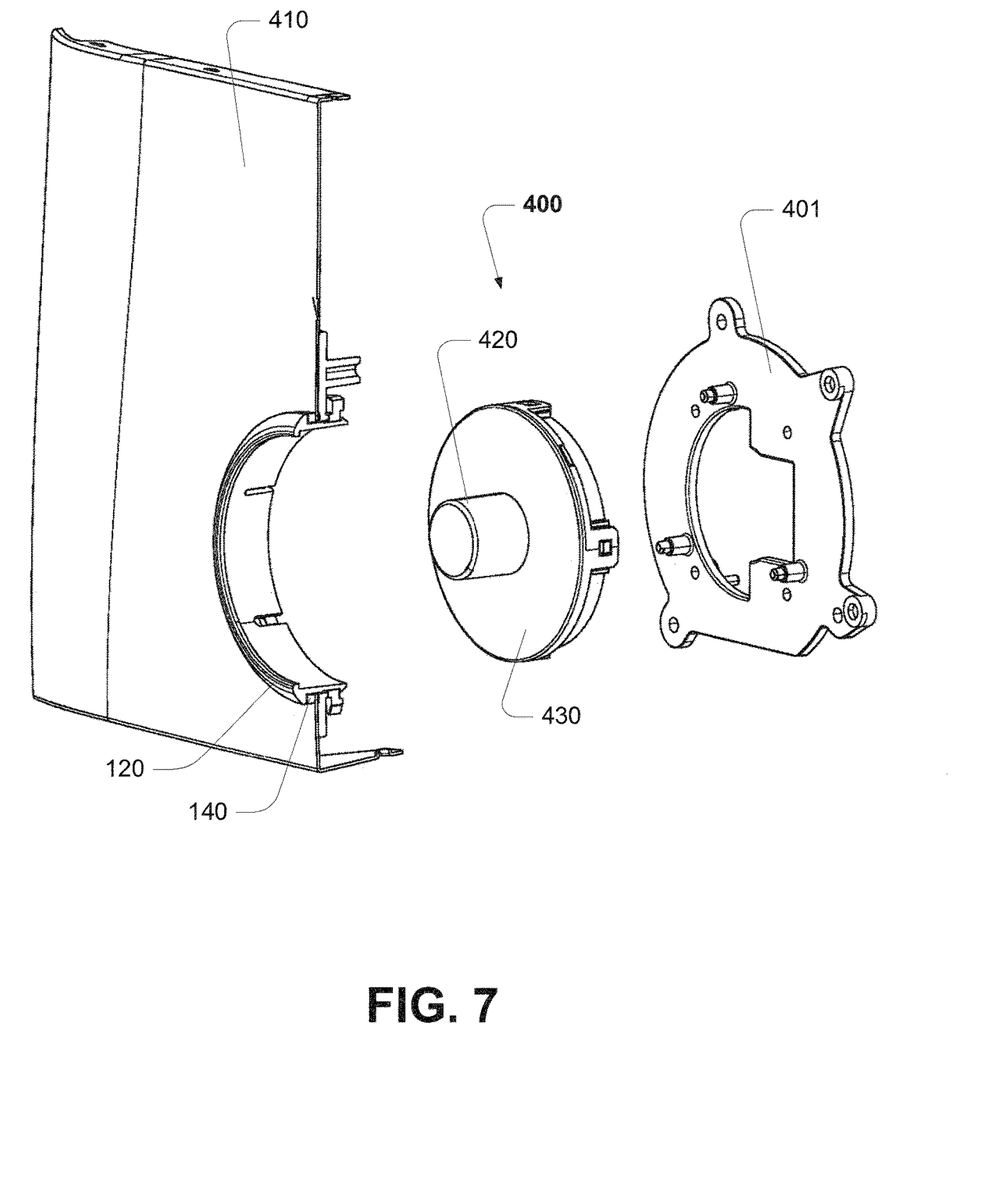
FIG. 7 is a perspective view of the disassembled apparatus of FIG. 5.

It will be appreciated that the hub module can be as assembled (as shown in FIG. 7), having a rotatable selection element or dial 420 accessible from the clear front lens element 430, with the needle indicator 422 between the lens element and graphics plate 432. The mounting sleeve 424 is inserted from the rear of the barrier element 434, engages the selection element 420 and the needle indicator 422. The selection element 420, the needle indicator 422 and mounting sleeve 424 are rotatable with respect to the barrier element 434. The lens element is further coupled to the barrier element, capturing the graphics plate and interleaved selection components.

An electronic module or PCB 440 includes a display 442, and may be fixed to the hub bracket 401. The electronic module supports the selection switch or variable resistor 152 (and slave gear 150) and the second (time/brownness) variable resistor 444. A key detail may be used to align the dial and time/brownness variable resistor. The display may include a plurality of light emitting diodes (LEDS).

A cover element 450 can be coupled to the assembly (for example screwed to a mounting plate) to cover all parts and provides a heat and crumb barrier.

Within a hub module, a selection dial 420 may be provided for a user defined parameter such as time, toasting darkness or motor speed. The selection dial is coupled to a needle indicator 422 using a mounting sleeve 424 that is directly mounted to a variable resistor 444 for providing a signal. In an embodiment, for example when used in a toaster, the selection dial may represent a selected shade of darkness a selected cooking time. The needle and variable resistor are keyed to the mounting sleeve, to respectively align the needle and variable resistor. The time selection variable resistor provides a signal that controls the display 442 (for example a plurality of LEDs) which indicates (or aligns with) the position of the needle. The display 442 is mounted to the electronic module 440 and located behind a graphics plate or diffusor 432 and a barrier element 434 such that light passes through. A barrier element behind the graphics plate (or diffusor) may separate the light into individual segments, or guide the light from the display to the graphics plate. The barrier may be moulded in black to restrict light bleed.

The graphics plate 432, by way of example, may be moulded in clear plastic with graphics printed on a back surface. Paint or over-moulding (for example, white) may be applied in either a full coat or a reduced coverage (for example, 50% opaque). A 100% coverage can result in a lower brightness. It will also be appreciated that, 100% coverage also reduces the visibility of the barrier holes—which, when the LEDs are off, does not disclose the presence of the LEDs. A 50% coverage yields a brighter light, but when the black barrier is visible it appears grey not white. An option is to spray the front surface of the barrier, but make the holes/light tubes 435 of the barrier black. This can define the line of where the light escapes the barrier. It will be appreciated that a plurality of LEDs forming a display may be located on the PCB to align with graphics plate and holes of the barrier.

Figure 8:
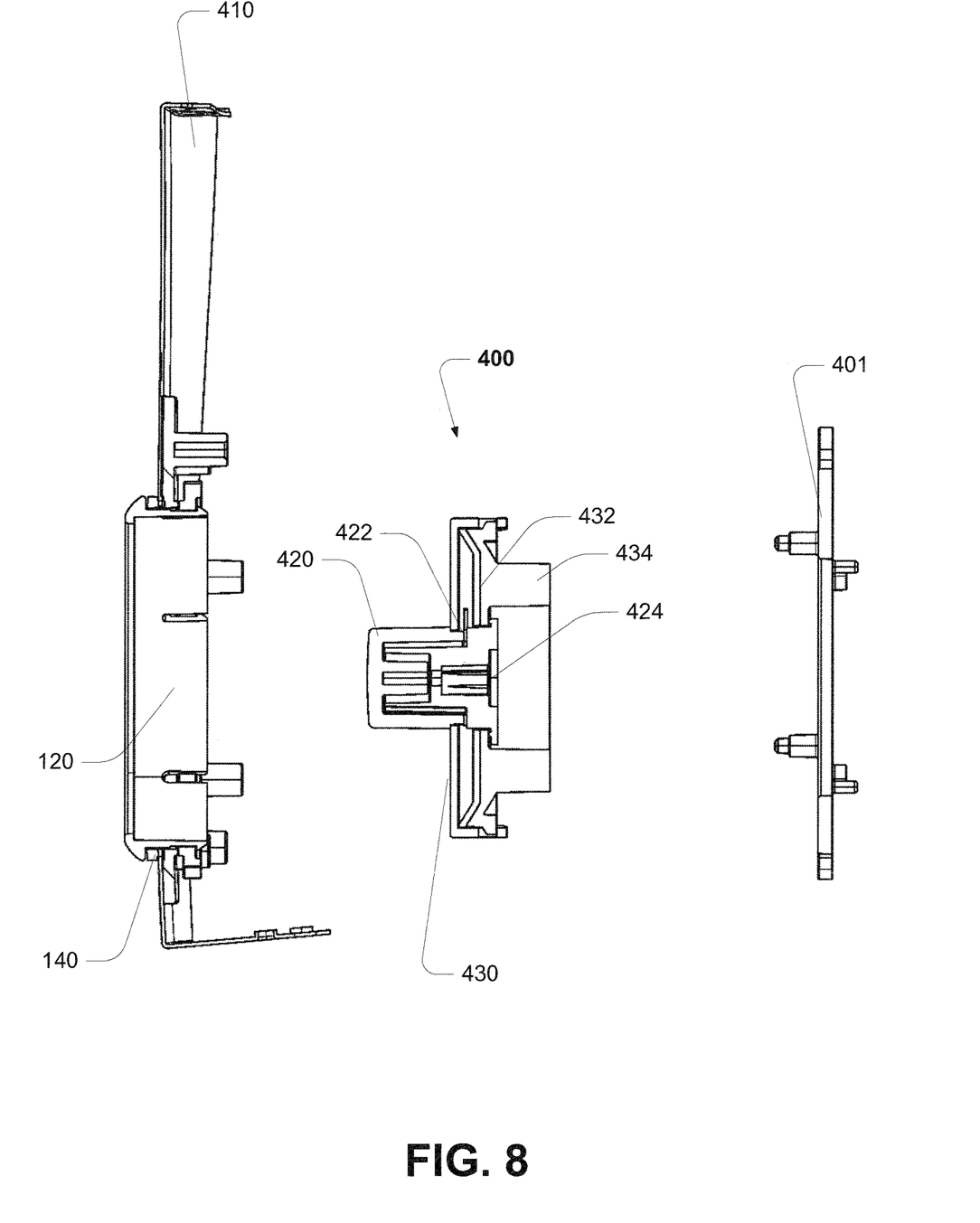
FIG. 8 is a sectional side view of the disassembled apparatus of FIG. 5.

FIG. 7 shows an inline for assembly view of an embodiment comprising the assembled selection hub of FIG. 5 and FIG. 6. FIG. 8 shows a sectional side view of the components shown in FIG. 7.

Figure 9:
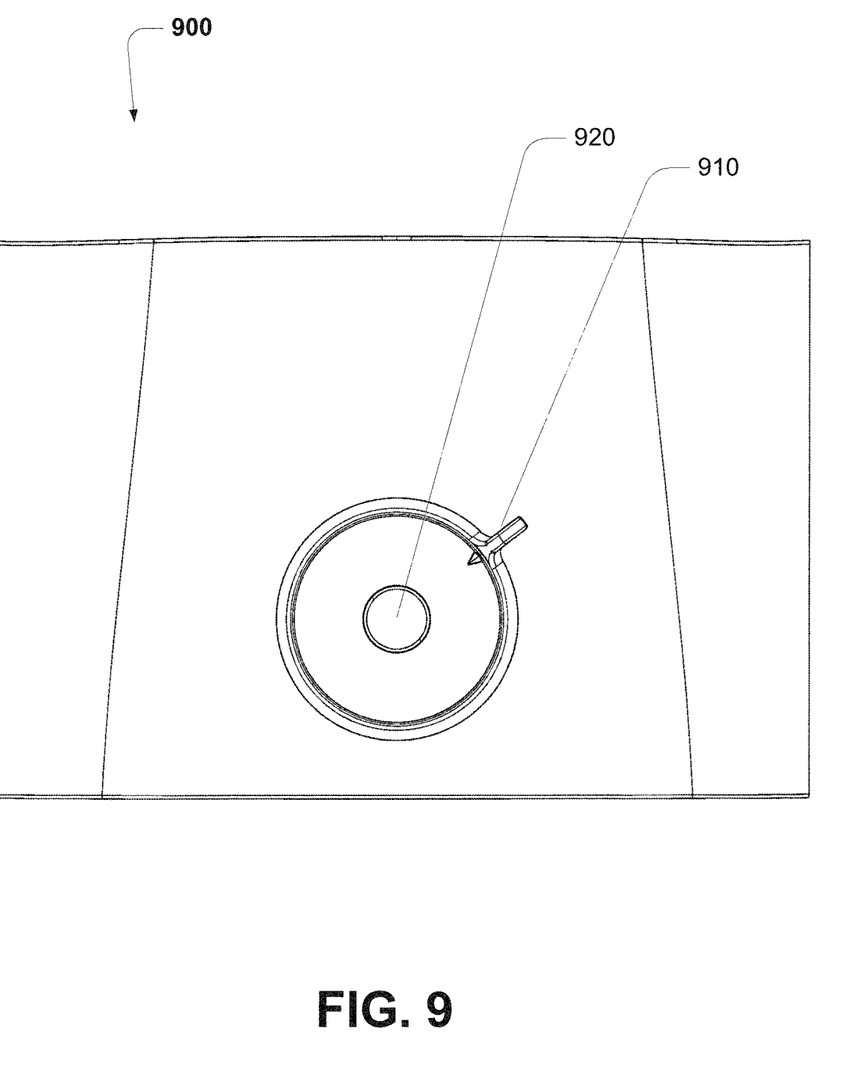
FIG. 9 is a front view of the apparatus of FIG. 5.
Figure 10:
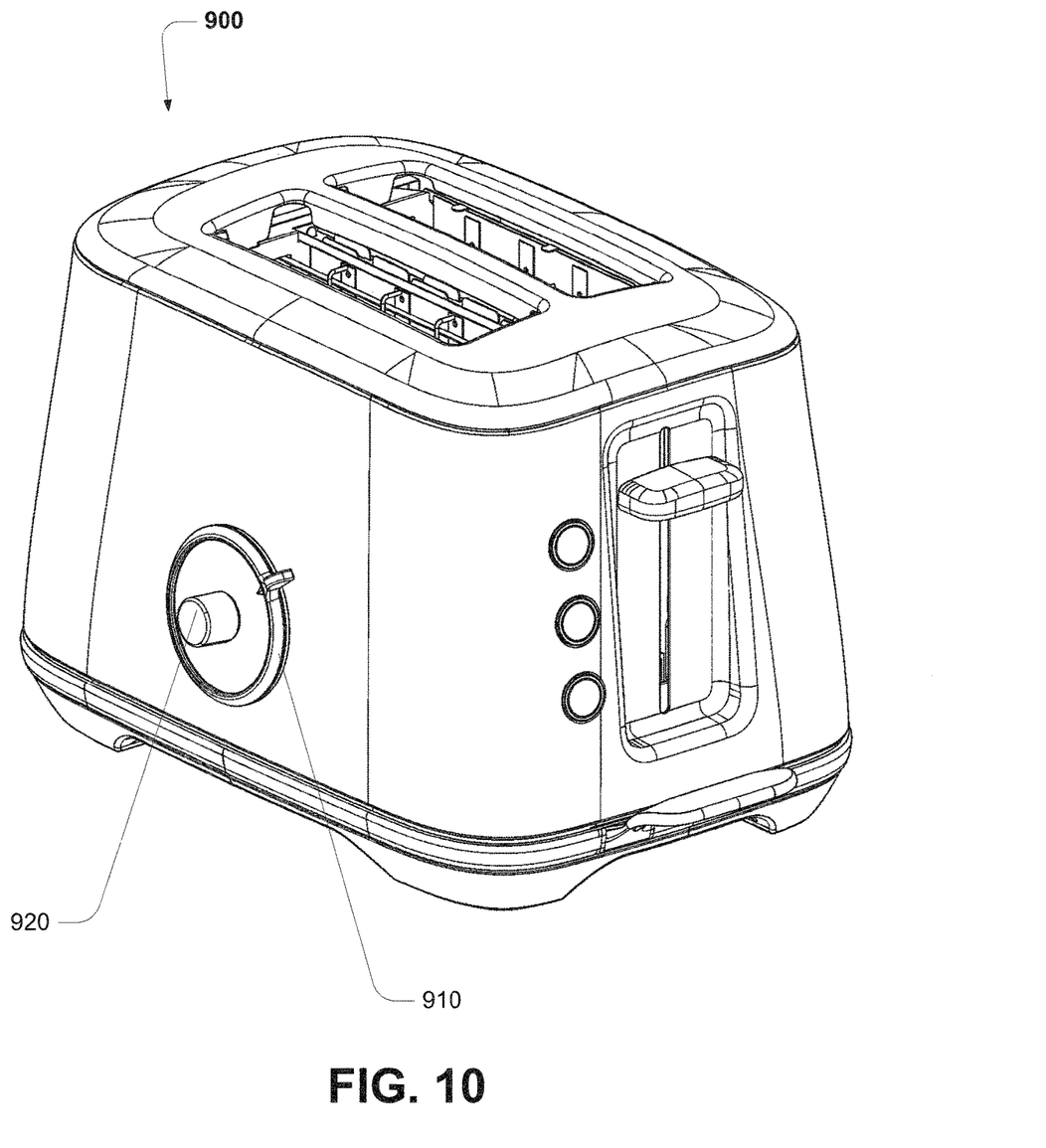
FIG. 10 is a perspective view of an appliance including the apparatus of FIG. 5.

FIG. 9 shows a front view of a toaster appliance 900 comprising a concentrically located dual the selection elements. FIG. 10 shows a prospective view of the appliance 900 of FIG. 9.

In this embodiment toaster 900, the user may separately select the bread type 910 (for example White, Fruit, Brown, Grain, Rye, Crumpet) and a time or brownness 920. Each bread type may be associated with a different cooking time for a selected brownness. A bread type selection (for example a crumpet configuration) may also be associated with a different distribution of heat to each side of the bread.

The disclosed embodiment may provide one or more of the following advantages:

(a) accommodate complex sidewall curvature (such as a toaster) where clearance tolerances are difficult to control;
(b) requires limited internal space between the sidewall of the appliance body and the other operating internal components;
(c) provides selection ring/or element having a narrow flange that maximises an internal display area;
(d) provides two variable resistor controls and LED display within a constrained space;
(e) enables alignment of the selector, variable resistors and display; and
(f) enables fixing to an appliance housing without visible fasteners.

An embodiment comprises a selection element or ring (for example, selection element 120) that is in communication with a sidewall of the appliance, and a fastening ring (for example, fastening ring 130) that forms selection gear. The selection ring has at least one retaining element and an alignment element, which when assembled, retains the selection gear in an aligned relationship with the selection ring.

In an embodiment, a hub element or module provides a second selection assembly. The second selection assembly has a body with a circular surface. The second selection assembly is dimensioned such that, when inserted into a selection ring element (for example, selection element 120), its proximity to an inner wall of the selection ring resists removal of the selection ring (or disassembly between the selection ring and fastening ring) because the retaining element of the selection ring is unable to release the fastening ring.

It will be appreciated that the mounting element or bracket (for example, mounting element 110) has protruding features in communication with the selection ring, fastening ring and spring biased locating tab. It will also be appreciated that an appliance sidewall can be constructed of pressed metal or plastic. If the appliance sidewall is made of plastics, any or all of the mounting element and protruding features may be integrally moulded with the sidewall, and remove the inclusion of a separate sidewall and mounting bracket.

A selection assembly includes a selection ring and selection gear. The selection ring is connected and aligned to the selection gear. This alignment is made with a key detail that aligns both parts together to ensure an alignment pointer is correctly positioned with respect to applied graphics. The selection ring and the selection gear captures an insulation ring or spacer. The selection ring and the selection gear also form a housing for a hub or lens module. The selection ring can rotate about a fixed hub assembly. The bearing surface for the selection element could be either the hub assembly or the mounting element.

A hub module or assembly is concentrically aligned with respect to the selection ring using a bracket. The hub assembly could be a guiding shoulder or a running surface for the selection ring.

Mechanical Operation

Mechanical operation is described with reference to example embodiments.

A selection ring rotates to select a function or operating mode.

The selection ring is connected to a selection gear. The selection ring and the selection gear are aligned to ensure an alignment pointer on the selection ring is correctly positioned with respect to graphics on an appliance. This alignment can, for example, be made with a key detail. The assembly can include an insulation ring.

The selection ring may be mounted on a mounting plate (with an optional housing). The selection ring may rotate, with respect to the mounting plate or apparatus. The selection ring can be in the form a narrow annulus.

Indents on the gear provide positional detents that engage a spring, which conforms to predefined selection configurations of the selection ring. The spring engagement provides selective selection configurations and positive user feedback. Gear teeth on the selection gear are further coupled to a variable resistor or rotational positional switch—for example via a slave gear). The additional variable resistor slave gear creates a drive train, which allows placement of the variable resistor away from the centre of the apparatus to accommodate a further variable resistor associated with a second selection assembly in the hub module. This also maintains a low profile assembly that is beneficial for a toaster applicant to increase distance from heater elements.

The selection ring optionally rotates on an insulation ring, to select a function or operating mode. An insulation ring provides a flat running surface for the selection ring, so selection ring can be mounted on surfaces that are not flat. The insulation ring can also act as a spacer to provide clearance requirements and electrical separation. The features of the insulation ring may alternatively be integrally formed with the housing, particularly if the housing was formed from plastics A variable resistor or rotational positional switch (or other means) is used for indicating user selection of function or mode. A predefined timetable can be stored, such that each function or mode setting has a pre-loaded time, this alters the associated time range. By using a second selector element, for example to select brownness (for example, a setting from 0 to 6), the associated time range for the respective minimum and maximum can differ for the user selected function or mode setting.

For example: for a first user selected function or mode, a time/brownness setting can define a respective cooking time as follows: setting 1-1.0 minutes and setting 2-3.30 minutes.

By selecting a mode or function, a processor module is adapted to perform the function, for example, that selectively operates one or more heater elements for a predefined time.

It will be appreciate that a variable resistor can provide a continuous selection of time or brownness in a predefined range.

A hub or lens module includes a lens element, graphics plate and the rear barrier element. The hub module further includes or supports a dial, mounting sleeve and needle indicator. The lens element couples or clips to the barrier element and captures the graphics plate and provides relevant alignment. The hub module mounts to a bracket to provide correct alignment with the apparatus and restricts rotation of the hub module.

A PCB including a display may be fixed to a hub bracket and supports the selection switch or variable resistor (and slave gear) and the second (time/brownness) variable resistor. A key detail may be used to align the dial and time/brownness variable resistor. The display may include a plurality of LEDS. It will also be appreciates that, in alternative embodiments, a screen or other type of light emitting display may be used.

Within the hub module, a time selection dial is coupled to a needle indicator with a mounting sleeve that is directly mounted to a variable resistor for providing a time signal. The needle and variable resistor are keyed to the mounting sleeve, to respectively align the needle and variable resistor. The time selection variable resistor provides a signal that controls the display (for example LEDs) which indicates (or align with) the position of the needle. The display (LEDs) is mounted to a PCB that is located behind a graphics plate or diffusor or a barrier such that light passes through. A barrier behind the graphics plate or diffusor may separate the light into individual segments, or guides the light from the display PCB to the graphics plate. The barrier may be moulded in black to restrict light bleed.

The graphics plate, by way of example, may be moulded in clear plastic with graphics printed on a back surface. A paint or over-moulding (for example, white) may be applied in either a full coat or a reduced coverage (for example, 50% opaque). A 100% coverage can result in a lower brightness. A 50% coverage yields a brighter light, but then the black barrier is visible it appears grey not white. An option is to spray the front surface of the barrier, but makes the holes/light tubes black. This can define the line of where the light escapes the barrier. It will be appreciated that a plurality of LEDs forming a display may be located on the PCB to align with graphics plate and holes of the barrier.

A cover can be coupled to the assembly (for example screwed to a mounting plate) to cover all parts and provides a heat and crumb barrier.

It will be appreciated that the illustrated apparatus can to provide an electro-mechanical interface for an appliance. It will be further appreciated that the illustrated embodiments disclose an apparatus including:

a mounting element 110 having a first side 111 and a second side 112, the mounting element having a mounting aperture 113 from the first side through to the second side;

a first selection element 120 in the form of a hollow sleeve that is partially located through the mounting aperture from the first side of mounting element;

a fastening ring 130 that engages the first selection element from the second side of mounting element, such that the first selection element is releasable retained from being withdrawn from the mounting aperture, wherein the first selection element is rotatable with respect to the mounting element; and a hub element 200 that is located within the circular-sleeve of the first selection element that restricts separation of the first selection element from the fastening ring.

Toaster Apparatus

It will be appreciated that, by way of example only, the disclosed apparatus can be included in a toaster appliance.

In a toaster appliance applying a constant heating output, the time taken for cooking bread is different for each bread type. The user selects the bread type (for example White, Fruit, Brown, Grain, Rye, Crumpet, Bagel or Sweet such as Fruit or Cinnamon). Each bread type can be associated with a different length of time to cook. A Crumpet or Bagel configuration may also be associated with a different distribution of heat output from the elements to each side of the bread. A non-constant heating output may also be applied to provide further control of the toasting output.

The User may seek to select: a pre-programmed bread type, the minimum and maximum time, brownness setting changes, and/or identify that the bread is frozen. For example, with a brownness scale of 0-6, a brownness setting of 3 will be associated with a cooking time for each pre-programmed bread type. Activating a crumpet setting changes the heater distribution and timetable.

A time or brownness setting is indicated with a pointer or LED indication lights. The LED may also indicate progress of cooking/toasting.

Interpretation It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. An electro-mechanical interface device for an appliance, the device including:
  a mounting element having a first side and a second side, the mounting element having a mounting aperture from the first side through to the second side;
  a first selection element in the form of a hollow sleeve that is partially located through the mounting aperture from the first side of mounting element;
  a fastening ring engages the first selection element from the second side of mounting element, wherein the first selection element is rotatable with respect to the mounting element;
  a hub module is located within a circular-sleeve of the first selection element, the hub module supporting a second selection element; and
  wherein the fastening ring includes a stop tab that restricts rotation of a locking ring to a pre-defined range.

2. The device according to claim 1, wherein the hub module restricts separation of the first selection element from the fastening ring.

3. The device according to claim 2, wherein the hub module is retained, such that it cannot be withdrawn from the first side of the first selection element.

4. The device according to claim 2, wherein the hub module is rigidly retained with respect to mounting plate, such that the first selection element rotates about the hub element.

5. The device according to claim 2, wherein the hub module further includes a second selection element.

6. The device according to claim 5, wherein the first selection element and the second selection element are each rotatable.

7. The device according to claim 5, wherein the first selection element and the second selection element are concentrically located.

8. The device according to claim 1, wherein the first selection element and the second selection element are each rotatable.

9. The device according to claim 1, wherein the first selection element and the second selection element are concentrically located.

10. The device according to claim 1, wherein the mounting aperture of the mounting element is a circular aperture.

11. The device according to claim 1, wherein the mounting aperture is circular and sized to receive the circular sleeve therethrough.

12. The device according to claim 11, wherein the flange portion is a radially outwardly protruding circumferential flange.

13. The device according to claim 1, wherein the first selection element has a flange portion that restricts the first selection element from passing through the mounting aperture.

14. The device according to claim 1, wherein the first selection element is rotatable to a user selection orientation.

15. The device according to claim 1, wherein the first selection element is coupled to an electronic module to generate a signal indicative of the user selection orientation that is transmitted to a processor module.

16. The device according to claim 1, wherein the first selection element has indicator tab for providing feedback of the current setting to a user.

17. The device according to claim 1, wherein the first selection element has a plurality of axial directed circumferential slots that form snap locking tabs there between.

18. The device according to claim 17, wherein the first selection element defines at least six locking tabs.

19. The device according to claim 17, wherein the snap locking tabs have a projection that releasably captures an inner circumference of the fastening ring.

20. The device according to claim 1, wherein the fastening ring includes a plurality of detents located or spaced about its circumference, and a biased locating tab abuts the circumference and the detents to selectively resist free rotation of the fastening ring.

21. The device according to claim 1, the device further including:
  a spacer ring located on the mounting element, wherein the spacer ring is sized to fit about the sleeve of the first selection element for insulating the first selection element from an internal element or an outer skin of the appliance.

22. The device according to claim 21, wherein the spacer ring engages the mounting element, and is keyed to the mounting element for prohibiting relative rotation.

23. The device according to claim 21, wherein the spacer ring provides a flat abutment surface for receiving the first selector element.

24. An electro-mechanical interface device for an appliance, the device including:
  a mounting element having a first side and a second side, the mounting element having a mounting aperture from the first side through to the second side;
  a first selection element in the form of a hollow sleeve that is partially located through the mounting aperture from the first side of mounting element;
  a fastening ring engages the first selection element from the second side of mounting element, wherein the first selection element is rotatable with respect to the mounting element;
  a hub module is located within a circular-sleeve of the first selection element, the hub module supporting a second selection element; and
  wherein the fastening ring includes a circumferential gear portion having a plurality of teeth that engages a slave gear, the slave gear is coupled to a variable resistor for providing a signal to a processor module.

25. An electro-mechanical interface device for an appliance, the device including:
  a mounting element having a first side and a second side, the mounting element having a mounting aperture from the first side through to the second side;
  a first selection element in the form of a hollow sleeve that is partially located through the mounting aperture from the first side of mounting element;
  a fastening ring engages the first selection element from the second side of mounting element, wherein the first selection element is rotatable with respect to the mounting element;
  a hub module is located within a circular-sleeve of the first selection element, the hub module supporting a second selection element, wherein the fastening ring includes a plurality of detents located or spaced about its circumference, and wherein a biased locating tab abuts the circumference and the plurality of detents to selectively resist free rotation of the fastening ring.

\* \* \* \* \*